(12) United States Patent  (10) Patent No.: US 7,717,498 B2
Fleming  (45) Date of Patent: May 18, 2010

(54) REDUCED WEIGHT COMPONENTS FOR VEHICLE FRAME AND METHOD OF MAKING SAME

(75) Inventor: Sean M. Fleming, Buchanan, VA (US)

(73) Assignee: Metalsa Servicios Sde RL (MX)

( * ) Notice: Subject to any disclaimer, the term of this patent is extended or adjusted under 35 U.S.C. 154(b) by 429 days.

(21) Appl. No.: 11/734,904

(22) Filed: Apr. 13, 2007

(65) Prior Publication Data

US 2007/0241587 A1 Oct. 18, 2007

Related U.S. Application Data

(60) Provisional application No. 60/792,268, filed on Apr. 14, 2006, provisional application No. 60/792,267, filed on Apr. 14, 2006, provisional application No. 60/792,269, filed on Apr. 14, 2006.

(51) Int. Cl.
*B60J 7/00* (2006.01)
(52) U.S. Cl. .................................. 296/203.01; 280/781
(58) Field of Classification Search ............ 296/203.01, 296/203.02, 203.03, 203.04; 280/781
See application file for complete search history.

(56) References Cited

U.S. PATENT DOCUMENTS

| | | | |
|---|---|---|---|
| 3,720,087 A | 3/1973 | Gottschli | |
| 4,006,617 A | 2/1977 | Foster | |
| 4,142,923 A | 3/1979 | Satava | |
| 5,855,394 A | 1/1999 | Horton et al. | |
| 6,189,930 B1 | 2/2001 | Kalazny | |
| 6,240,820 B1 | 6/2001 | Sturrus et al. | |
| 6,345,425 B1 | 2/2002 | Rosasco et al. | |
| 6,360,441 B1 | 3/2002 | Himsl et al. | |
| 6,488,791 B1 | 12/2002 | Powers, II | |
| 6,681,489 B1 | 1/2004 | Fleming | |
| 2004/0070190 A1* | 4/2004 | Ridge et al. | 280/781 |

* cited by examiner

*Primary Examiner*—Lori L Lyjak
(74) *Attorney, Agent, or Firm*—Andrus, Sceales, Starke & Sawall, LLP (57) ABSTRACT

A vehicle frame component, such as a siderail or a cross member, is formed with a generally C-shaped cross section in which the vertical web member has a greatly reduced mass, as compared to a comparable C-channel section of uniform construction. The reduced mass web member has a corresponding reduced effective cross section to substantially reduce the component weight without adversely affecting its vertical stiffness.

5 Claims, 9 Drawing Sheets

REDUCED WEIGHT COMPONENTS FOR VEHICLE FRAME AND METHOD OF MAKING SAME

CROSS REFERENCE TO RELATED APPLICATION

This application claims priority to and the benefit of U.S. Provisional Application Nos. 60/792,268, filed Apr. 14, 2006; 60/792,267, filed Apr. 14, 2006; and 60/792,269, filed Apr. 14, 2006.

BACKGROUND OF THE INVENTION

The present invention relates to frames for vehicle chassis and, more particularly, to weight saving siderail components for heavy truck frames. Methods of making such frame components are also disclosed.

In order to meet federally mandated vehicle emission requirements, truck manufacturers have had to use larger cooling packages and exhaust systems. In addition to the added cost, these changes also add significantly to the vehicle weight and, as a result, to reduced fuel efficiency. Therefore, there is great emphasis on weight reduction in all vehicle components.

SUMMARY OF THE INVENTION

The present invention is directed to weight reduction in the main frame members of heavy duty trucks by eliminating material in areas having little effect on frame strength and durability. In particular, the siderail of heavy truck frames are typically made from C-section steel channel members, either heat treated steel or high strength low alloy (HSLA) steel. The sections are typically used for the main siderail pair, but may also function as the connecting cross members and connecting brackets (if used). The siderail flanges provide most of the siderail stiffness in the vertical direction, which stiffness is the primary strength requirement in truck frames. Because the web which connects the flanges has little effect on vertical stiffness, it is believed that removal of material from the web can be undertaken without significant decrease in vertical stiffness.

In accordance with one embodiment of the present invention, a sheet steel blank is provided, in a center region, with a series of strategically placed longitudinal slits along its full length. The blank is then stretched transversely to open the slit web to its final desired width. Two variant methods are disclosed for this embodiment, the result of which is the fabrication of siderails of substantially reduced weight, but only a nominal reduction in vertical stiffness. The method is also applicable to the manufacture of frame cross members.

In accordance with another embodiment of the present invention, a steel C-section channel preform with a narrow web is cut longitudinally to provide upper and lower angle sections that are spaced apart to provide the upper and lower flanges of a siderail and short upper and lower web portions. The angle sections are spaced to the desired siderail height and connected to the common end of a cross member. The resulting siderail has very little WEB material, resulting in a siderail of substantially reduced weight, but only a nominal reduction in vertical stiffness.

In accordance with a further embodiment of the present invention, a structural channel for the siderail of a heavy truck frame is fabricated from a pair of heavy gauge angle members for the upper and lower flanges and a lighter gauge web section interconnecting the flange angles. The web section is formed with a number of offsets to provide added stiffness. The overall assembly provides a significant reduction in weight as compared to a unitary channel member made of the same heavy gauge steel.

DETAILED DESCRIPTION OF THE PREFERRED EMBODIMENTS

Figure 1:
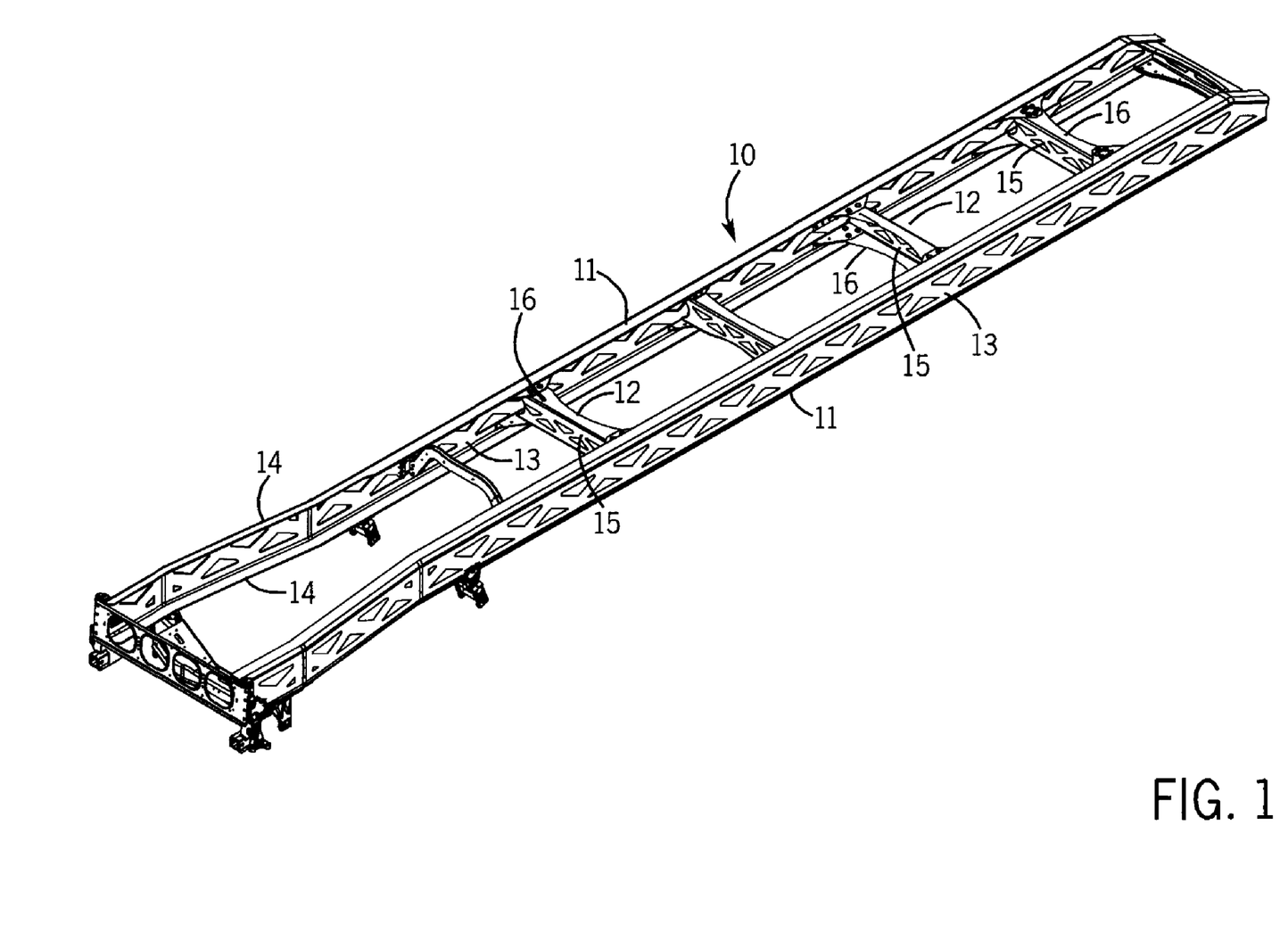
FIG. 1 is a perspective view of a heavy duty truck frame utilizing expanded metal siderails and expanded metal cross members made in accordance with methods of the present invention.

The truck frame 10 shown in FIG. 1 includes, as its main components, a pair of spaced parallel siderails 11 which are interconnected by a series of cross members 12, all in a manner well known in the industry. Each of the siderails 11 comprises a C-section channel member having a vertically disposed intermediate web 13 that interconnects upper and lower flanges 14. Similarly, at least some of the cross members 12 comprise C-section channel members, each having an intermediate web 15 and integrally formed upper and lower flanges 16. The cross members 12 may be attached to the siderails 11 by welding or bolted connections, also in a manner well known in the industry.

Figure 2:
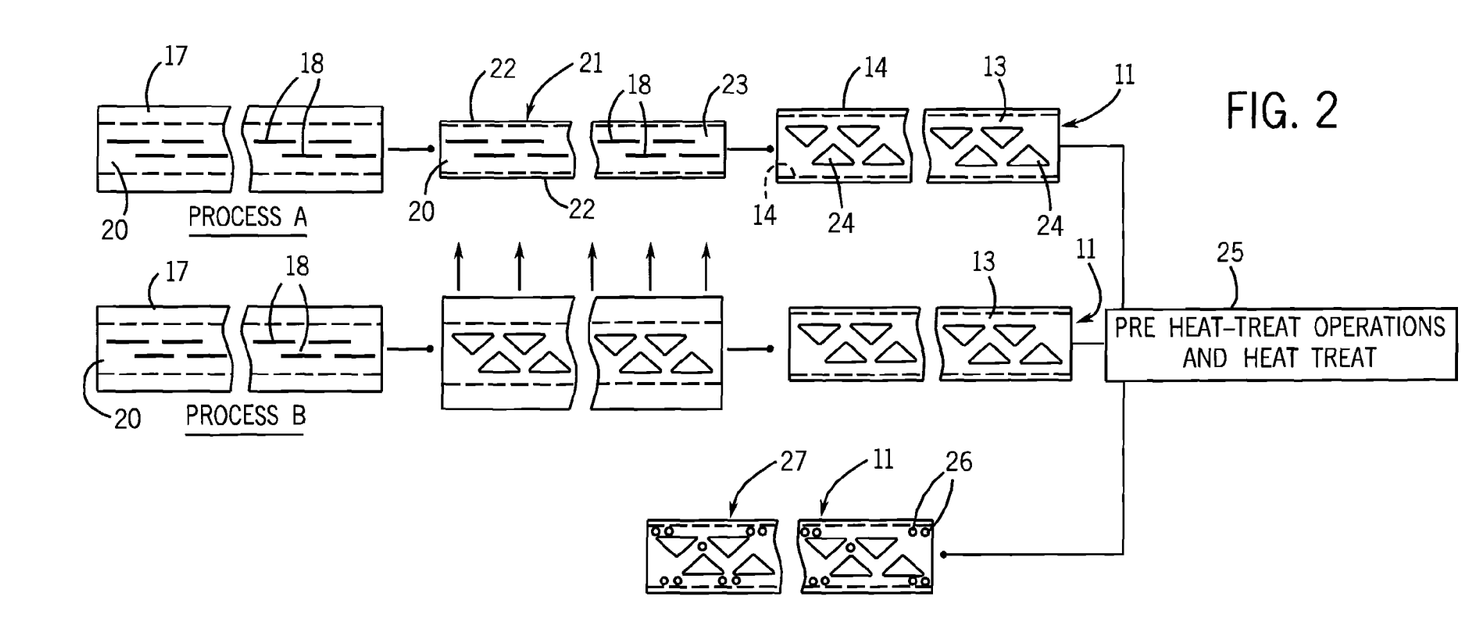
FIG. 2 is a process flow diagram showing schematically two methods for making expanded metal frame components.

Referring also to FIG. 2, there are shown two slightly different processes for making expanded metal frame components in accordance with the present invention. In the upper Process A, a flat sheet 17 of steel may be provided as either a blank or cut from a coil. The flat sheet 17 is provided with a series of staggered slits 18 along its length in a center region 20 which will become the web of a C-section channel member. The slit sheet 17 is then formed into a channel preform 21 by bending the opposite lateral edges to form preform flanges 22 with an intermediate preform web 23. It should be noted that the preform web 23 has a height (distance between preform flanges 22) substantially less than the width of the web 12 in the completed siderail 11. The channel preform 21 may be conveniently formed by roll forming or press forming in a known manner.

In the next process step, the channel preform 21 is stretched in a direction transverse to the preform flanges 22 causing the preform web 23 to open and expand in width to the final desired dimension for the siderail 11. The resulting openings 24 in the web 13 result in a significantly reduced effective vertical cross section and provide a substantial reduction in weight, for example, 20%-25%. The stretching step may also be accomplished using conventional roll forming or press forming techniques and equipment.

If the siderail 11 is made from a low yield strength steel (30,000-50,000 psi), it is next subjected to heat treating steps 25 which typically comprises austenitizing, quenching and tempering to increase the yield strength to, for example, 100,000 psi. However, if the steel sheet 17 from which the siderail 11 is formed is made from a high strength low alloy steel (HSLA), the heat treating steps 25 are eliminated.

The final processing of the siderail 11, prior to fabrication into the frame 10, may include piercing of connecting holes 26, sandblasting and painting, all of which are schematically represented as station 27.

The foregoing method may be applied as well to the manufacture of expanded cross members 12. The method disclosed herein is particularly attractive because it results in very little waste material.

In the alternate Process B shown in FIG. 2, a flat blank sheet 17 is provided with slits 18 in the same manner described with respect to Process A. In the next step, however, slit sheet 17 is stretched laterally in its flat condition to expand the blank to provide the openings 24 and a final desired width of the flange 14. In the following step, the final shape of the siderail 11 is provided by roll forming or press forming the flanges 14. In Process B, there is, therefore, no channel preform 21 as there is in Process A.

The siderail 11 is thereafter subjected to heat treating 25, if required, and the final finishing steps at 27.

It is anticipated that a weight reduction in the range of about 15% in siderails made in accordance with this invention will result in only a nominal decrease in vertical stiffness, such that vertical stiffness up to 95% of a comparable solid channel member would be retained. The weight saving, however, is extremely significant for the reasons set forth above.

In the following Table 1, the mass or weight of the baseline frame and component siderail are compared to the siderail and frame of FIG. 1. The numbers in the row for the FIG. 1 construction indicate the percent reduction from the base line frame and siderail. Similarly, vertical stiffness and torsional stiffness of the baseline frame are compared to the expanded metal frame of FIG. 1 in terms of the percent reduction in these stiffness measurements. With respect to vertical stiffness, the 5% reduction in the FIG. 1 frame can be attributed primarily (about 95%) to the siderails 11.

TABLE 1

| Frame Type | Mass, (lbs) | | Stiffness, % | |
|---|---|---|---|---|
| | % base | | Vertical, | Torsional |
| | Siderail | Frame | (lbs/in) | (ft-lb/deg) |
| Baseline | 902 | 1268 | 15,423 | 252 |
| Expanded Metal (FIG. 1) | −15 | −13 | −5 | −10 |

Figure 3:
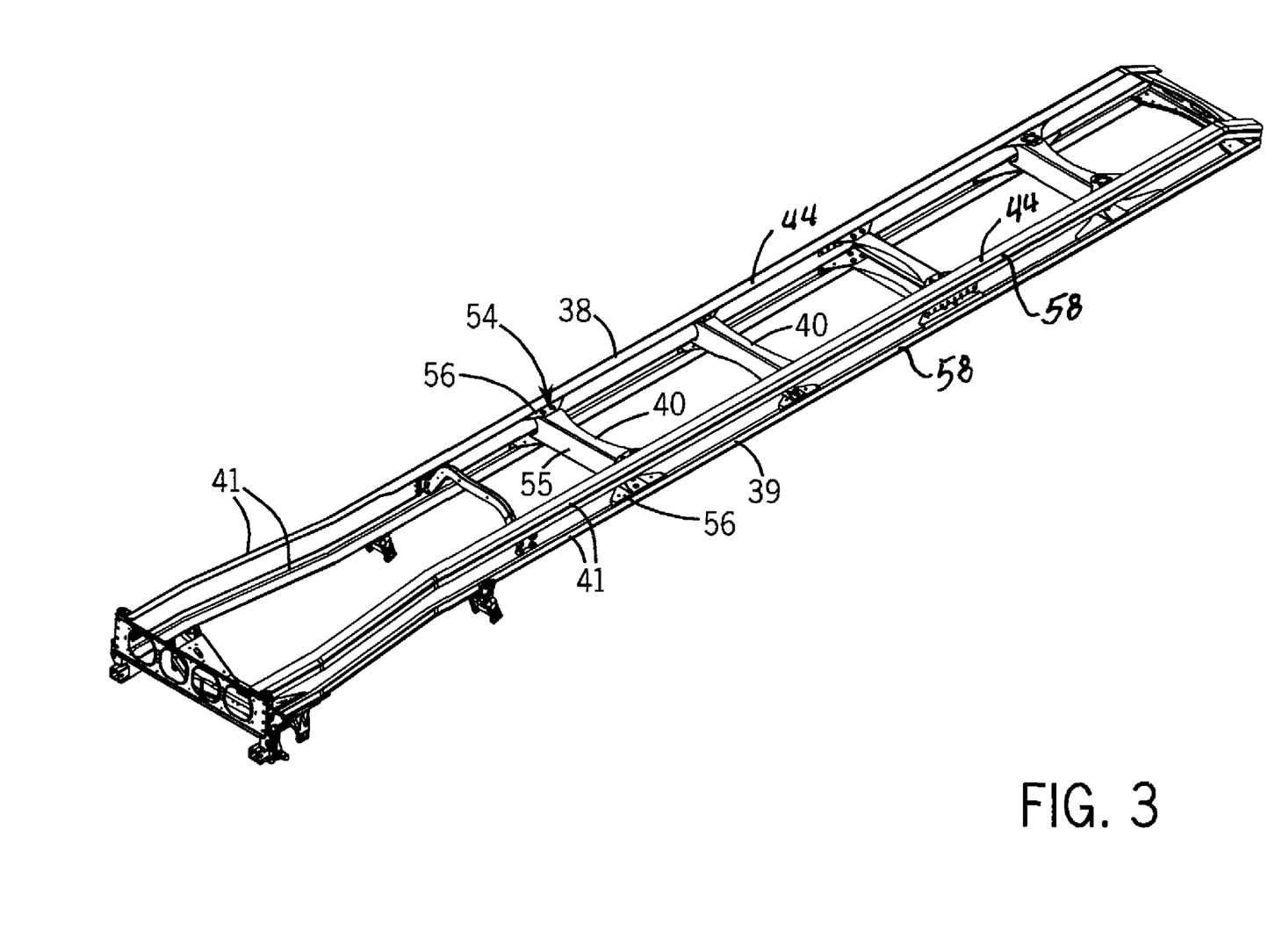
FIG. 3 is a perspective view of a heavy duty truck frame utilizing the "webless" siderails made in accordance with another method of the present invention.

Referring initially to FIG. 3, a truck frame 38 includes a pair of laterally spaced parallel siderails 39, interconnected at various points along their lengths by cross members 40. As contrasted to more conventional siderails, however, each of the siderails 39 comprises a pair of upper and lower angle sections 41 instead of a single C-section channel member. Thus, much of the space occupied by the web of a conventional C-section channel member is eliminated in the siderails 39.

Figure 6:
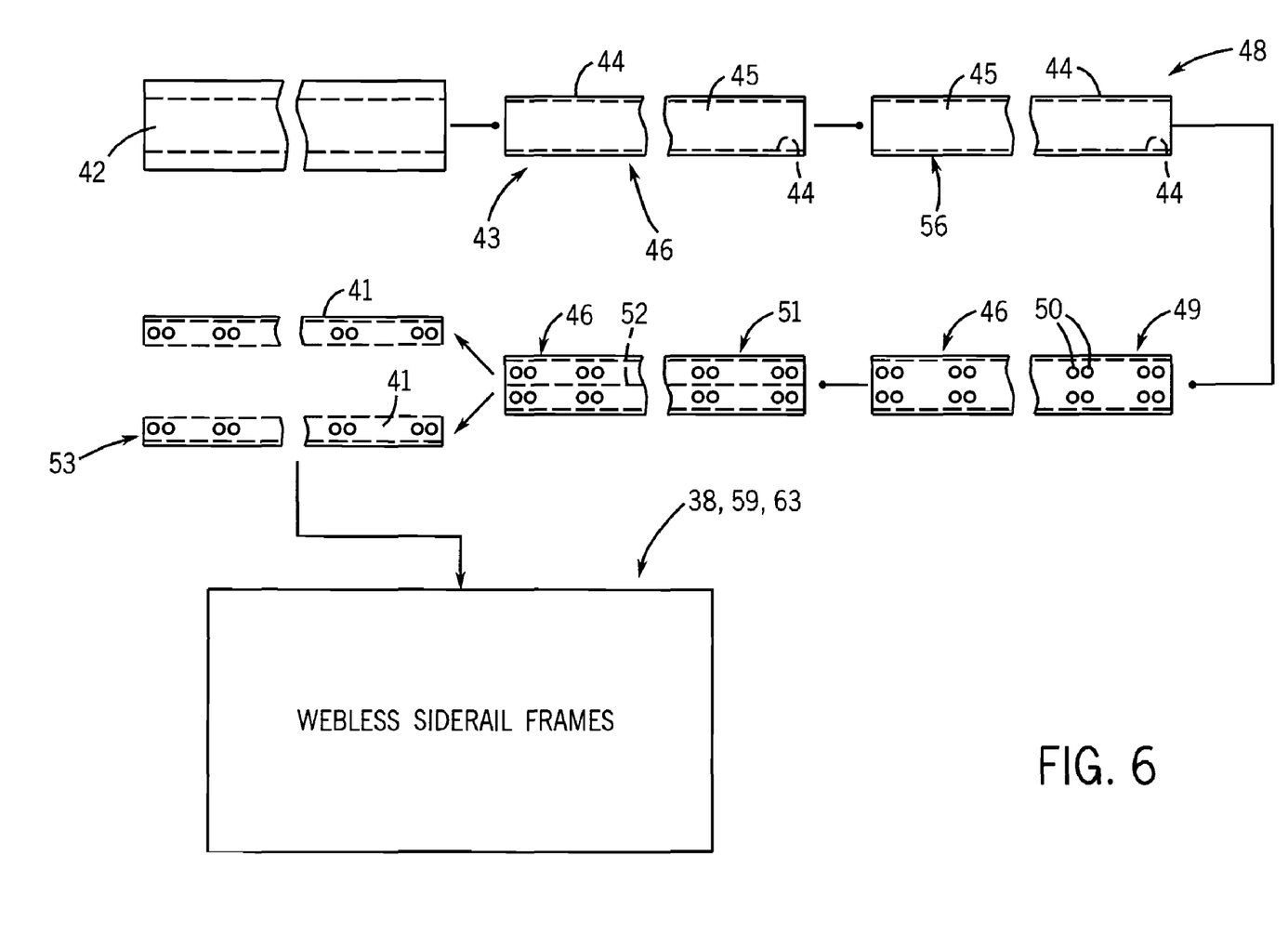
FIG. 6 is a process flow diagram showing schematically the method for making webless siderails in accordance with this embodiment of the present invention.

Referring also to FIG. 6, each siderail 39, comprising upper and lower angle sections 41 is formed from a steel sheet blank 42. In a forming step 43, the lateral edges of the blank 42 are turned about 90° to form the flanges 44, interconnected by a web 45, of a C-section channel preform 46. If the channel preform 46 is made from a low yield strength steel having a yield strength in the range of 30,000-50,000 psi, the preform is next subjected to a heat treating operation 48 including, for example, the steps of austenitizing, quenching and tempering, all in a well known manner. However, if the preform is made with HSLA steel, the heat treating operation is eliminated.

The channel preform 46 is then subjected to a piercing step 49 to provide the bolt holes 50 for assembly of the frame or for the connection of other frame parts.

In a subsequent cutting step 57, the web 45 of the preform is cut or sheared longitudinally on its centerline 52 to form the two angle sections 41. Although the angle sections are identical in the process thus far described, the channel preform 46 could be cut on a line offset from the centerline 52 to provide upper and lower siderails pieces of slightly different size and shape.

In a final processing step 53, angle sections 41 may be completed by sandblasting and painting, after which they are ready for assembly into a frame 38.

Referring again to FIG. 3, a cross member assembly 54 is used to interconnect each upper and lower pair of angle sections 41 and to interconnect spaced pairs of webless siderails 39. The cross member assembly 54 may include channel, angle, box or other section cross member pieces 55 and end brackets 56 for effecting direct connection to the web portions 58 of the angle sections 41. The upper and lower flanges 44 remain fully intact and provide most of the vertical stiffness of the section. The large open space between the opposed edges of the upper and lower web portions 58 illustrates the great saving in weight provided by the method and assembly of the present invention. A weight reduction in excess of 20%, as compared to a siderail having a full web, may be effected in accordance with the present invention. On the other hand, decrease in vertical stiffness of only about 15% can be attained in a frame utilizing these webless siderails.

The following Table 2 is similar to Table 1 and shows the percent reduction in frame and siderail weight of the FIG. 3 frame as compared to the baseline frame made with conventional full section siderails.

TABLE 2

| Frame Type | Mass, (lbs) | | Stiffness, % | |
|---|---|---|---|---|
| | % base | | Vertical, | Torsional |
| | Siderail | Frame | (lbs/in) | (ft-lb/deg) |
| Baseline | 902 | 1268 | 15,423 | 252 |
| Webless (FIG. 3) | −20 | −10 | −15 | −10 |

Figure 4:
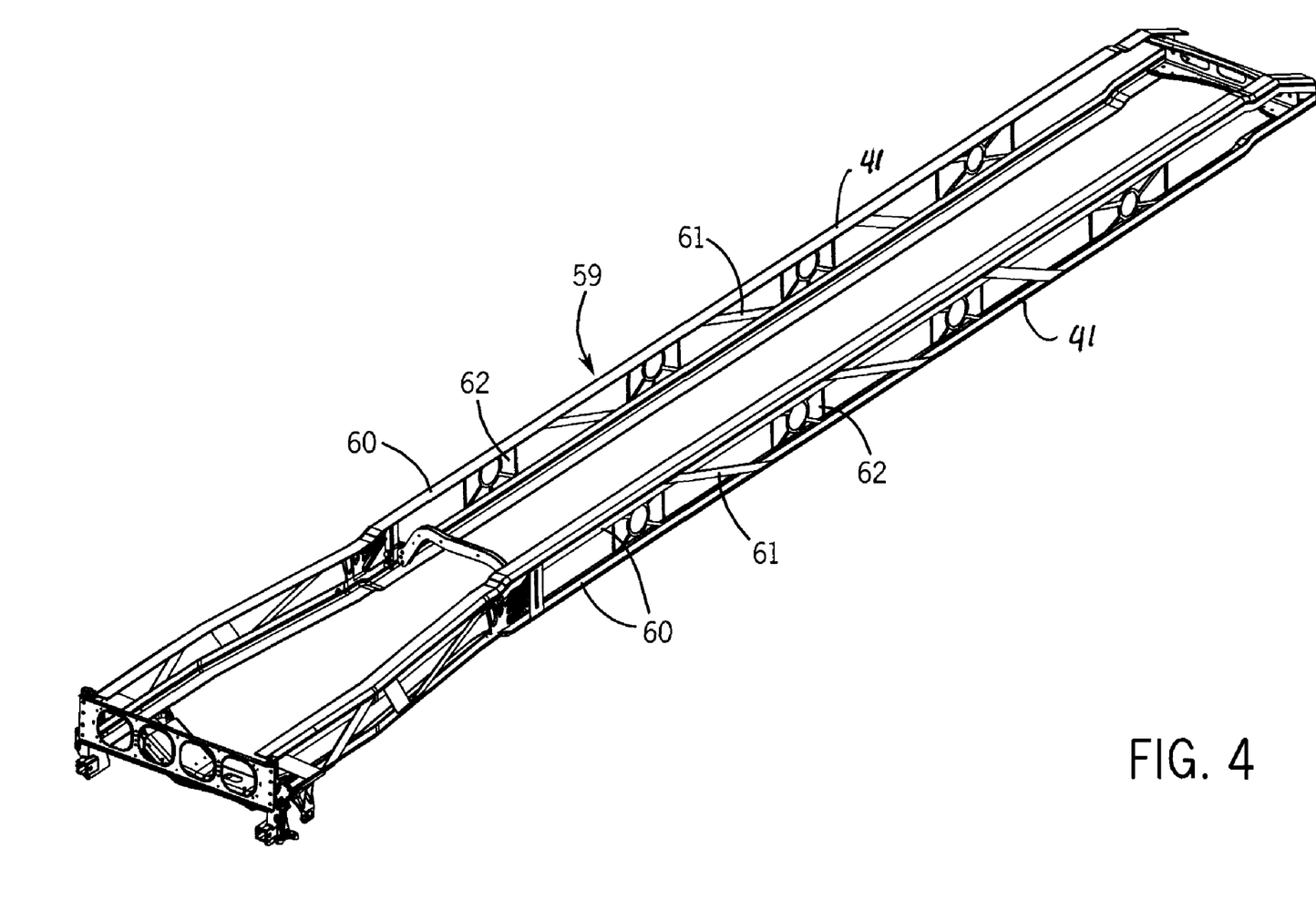
FIGS. 4 and 5 are perspective views of alternate truck frames embodying deeper siderails, but made in accordance with the method of the FIG. 6 embodiment of the present invention.

Referring now to FIG. 4, a modified frame 59 is shown which has siderails 60 comprising upper and lower angle sections 41 cut from a channel preform 46 in the manner previously described. However, because the siderails 60 are substantially deeper vertically than the siderails 39 of the FIG. 3 embodiment, it may be desirable to connect the upper and lower angle sections 41 with web members 61 as in a conventional truss or with open truss-like plates 62 spaced along the length of the angles, or a combination of both.

Figure 5:
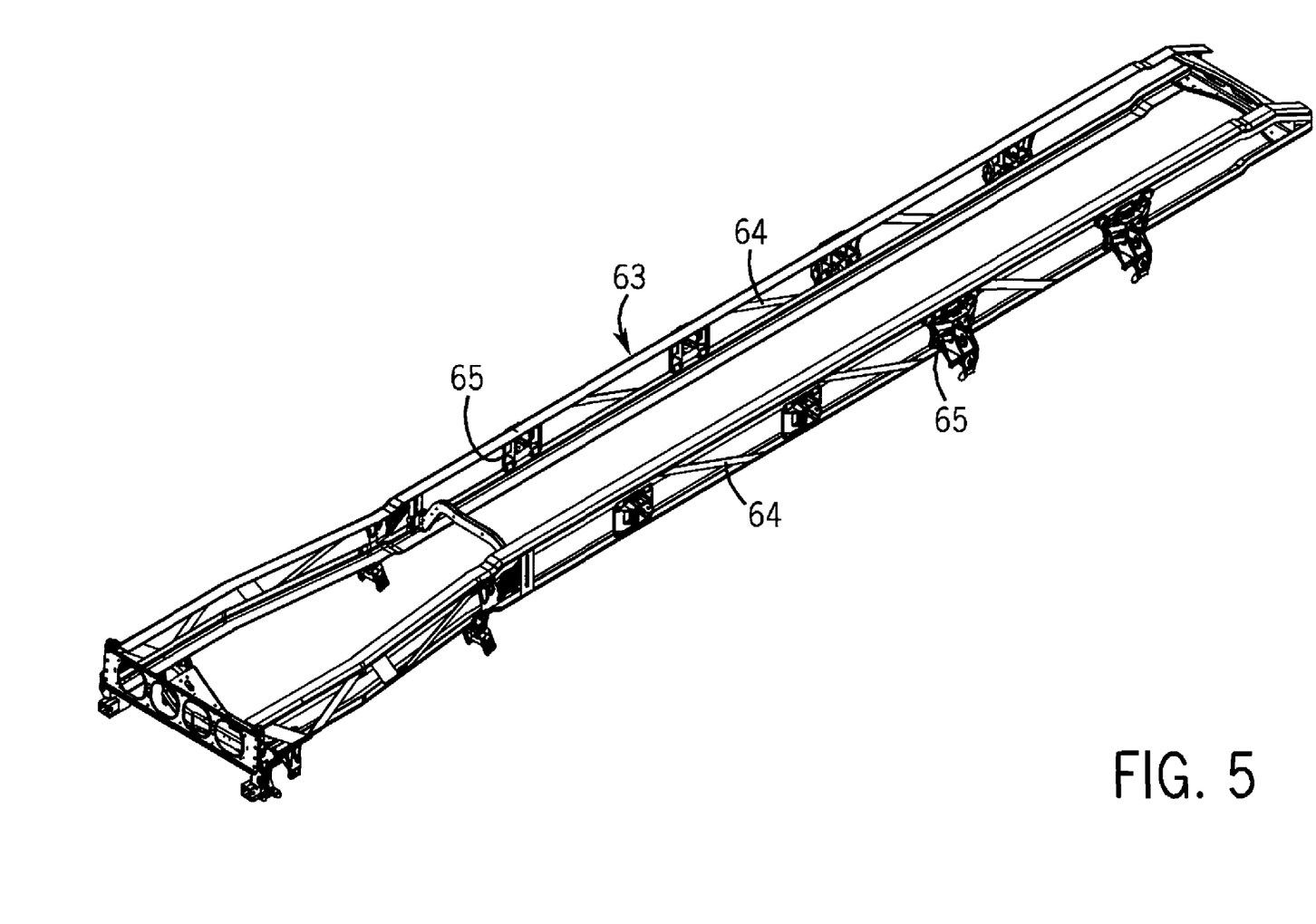

In FIG. 5, there is shown a further modified frame 63 that utilizes somewhat longer web members 64 and truss-like plates 65 of a somewhat different construction from the plates 62 of the FIG. 4 embodiment.

Figure 7:
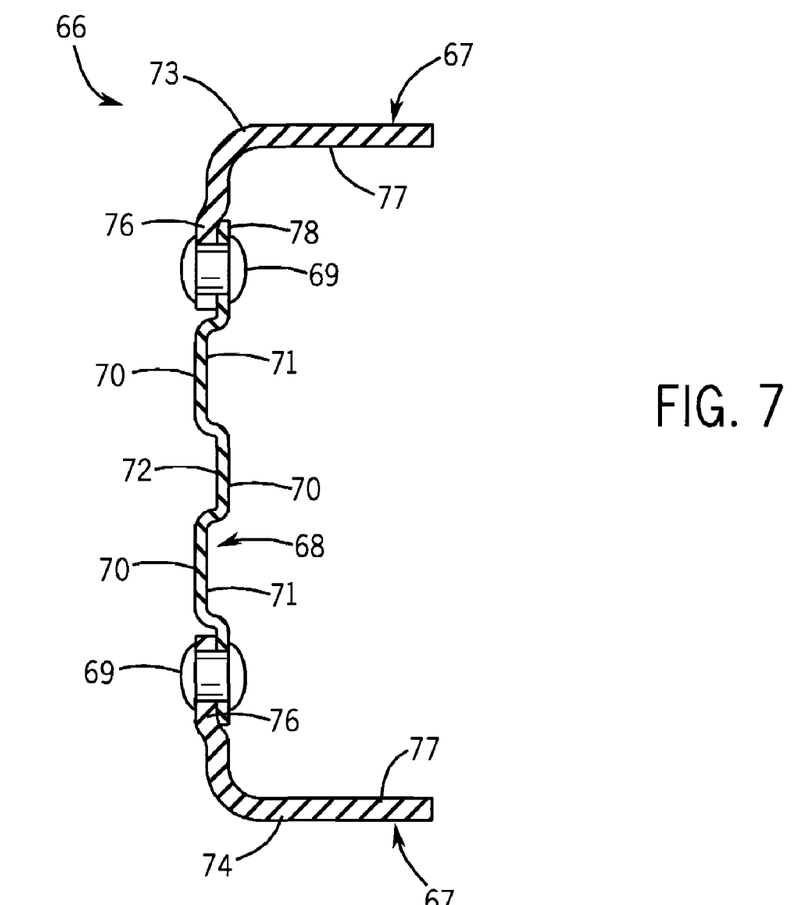
FIG. 7 is a vertical section through a fabricated channel member of a further embodiment of the present invention.

A fabricated siderail 66 of the further embodiment of the invention is shown in vertical section in FIG. 7. The siderail 66 includes upper and lower angle sections 67 of a heavy gauge steel and an intermediate connecting web section 68 of a lighter gauge steel. In the section shown, the angle sections 67 are attached to the intermediate web section 68 with rivets 69. However, bolted connections may also be used.

The web section 68 is formed with three longitudinally extending offset sections 70, including two wider outside offsets 71 and a somewhat narrower center offset 72. The section thus takes on a wave-like or corrugated appearance. The effect of the wavy or corrugated section is to increase the stiffness and other strength characteristics of the web 68 to compensate for the substantial decrease in gauge of the material used. For example, the gauge of the web section 68 may be 0.157 inch (4 mm), whereas the gauge of the angle sections 67 is 0.315 inch (8 mm).

Figure 8:
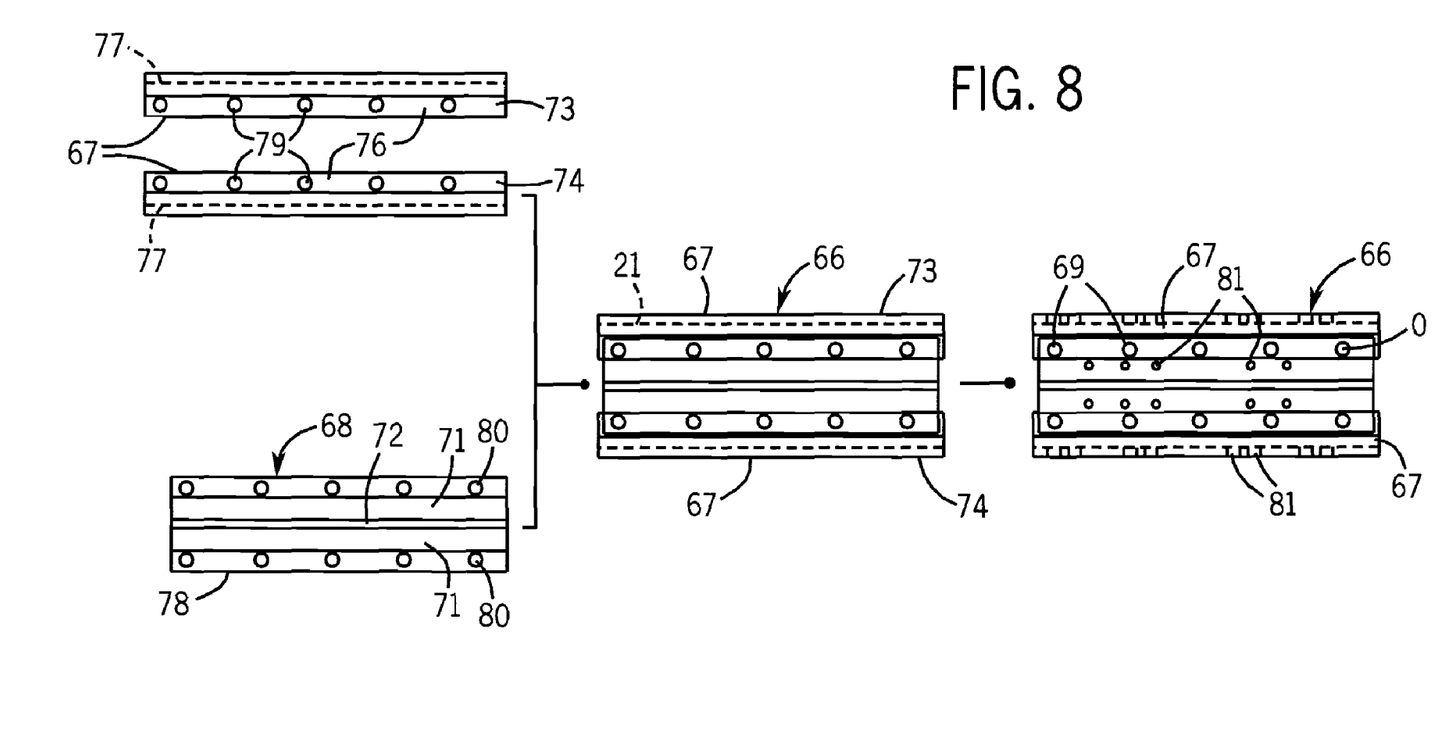
FIG. 8 is a flow chart of the process for making the fabricated siderail member of FIG. 7.

Referring to FIG. 8, the upper and lower angle sections 73 and 74 are formed in a conventional manner using either a roll forming process or stamping in a press brake or the like. Each of the angle sections includes a full heavy gauge flange 77 and leg 75. An offset 76 on the leg 75 accommodates connection to a lateral edge 78 of the web section 68, as best seen in FIG. 7. In a subsequent step, connecting holes 79 are formed in the web legs by piercing, cutting or punching in a known manner.

The web section 68 is similarly formed by roll forming or pressing to form the corrugated or wavy cross section described above and shown in FIG. 7. The lateral edges 78 of the web section 68 are subsequently pierced to form connecting holes 80 to compliment the connecting holes 79 in the angle sections 67.

The composite siderail 6 is then assembled by riveting or bolting or welding the angle sections 67 to the opposite lateral edges of the web section 68. The fabricated siderail is then subjected to a piercing step to provide holes 81 in the web section 68 and, if necessary, in the flanges 77 as well to facilitate assembly into the truck frame or for the connection of other components or equipment.

Figure 9:
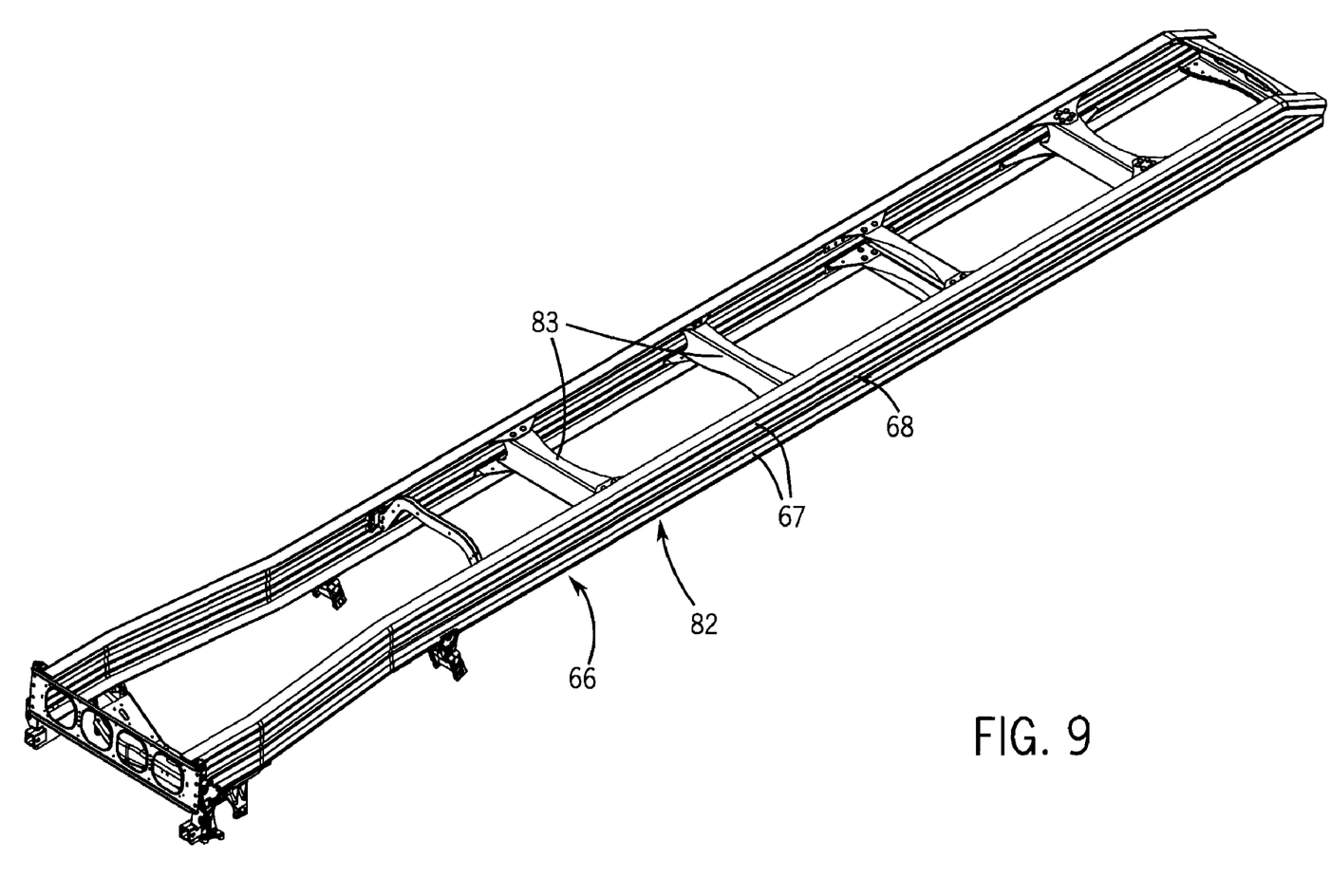
FIG. 9 is a perspective view of a partially assembled heavy truck frame utilizing the fabricated siderail of the present invention.

In FIG. 9, there is shown a heavy truck frame 82 including siderails 66 of the present invention. The two siderails 66 are connected by a series of cross members 83 in a conventional manner using riveted, bolted or welded connections.

The siderail 66 made in accordance with the method of the present invention and utilizing the lighter gauge steel for the web section 68 will provide a vertical stiffness equivalent to the vertical stiffness of a unitary siderail channel of conventional construction using the heavier gauge material of the flange angle sections 67. However, the siderail 66 of the present invention can provide an overall siderail weight reduction of 10%-20% as compared to the unitary heavy gauge construction of the prior art.

Table 3, which follows, shows the weight reductions in the siderail and the frame incorporating these siderails as shown in FIG. 9. As can be seen, the siderail is 19% lighter than the full section siderail of the baseline frame and the frame as a whole is 17% lighter. The vertical stiffness in the FIG. 9 frame (95% of which may be attributed to the siderails 66) is only 7%. The calculated reduction in torsional stiffness of the FIG. 9 frame as compared to the baseline frame is also shown, but this is not a critical property. Vertical stiffness, however, is extremely important and the indicated reduction of only about 7% is quite significant.

TABLE 3

| Model | Mass, (lbs) | | Stiffness, % | |
| --- | --- | --- | --- | --- |
| | % base | | Vertical, | Torsional |
| | Siderail | Frame | (lbs/in) | (ft-lb/deg) |
| Baseline | 902 | 1268 | 15,423 | 252 |
| Wave (FIG. 9) | −19 | −17 | −7 | 10 |

I claim:

1. A reduced weight, vertically stiff structural component for the frame of a vehicle chassis comprising:
    a steel body having a generally C-shaped vertical cross section, including upper and lower horizontal flanges interconnected by a vertical web member;
    the flanges sized to provide substantially all of the vertical stiffness of the structural component; and,
    the web member having a substantially reduced effective vertical cross section by the removal of web material without adversely affecting the vertical stiffness of the component; and,
    wherein the reduced effective vertical cross section comprises an expanded metal web member.

2. A reduced weight, vertically stiff structural component for the frame of a vehicle chassis comprising:
    a steel body having a generally C-shaped vertical cross section, including upper and lower horizontal flange interconnected by a vertical web member;
    the flanges sized to provide substantially all of the vertical stiffness of the structural component;
    the web member having a substantially reduced effective vertical cross section by the removal of web material without adversely affecting the vertical stiffness of the component; and,
    wherein the frame component comprises a siderail, the horizontal flanges comprise a pair of vertically separated individual angle members each having an integral vertical flange, and the reduced effective vertical cross section of the web member comprises frame cross member components interconnecting the vertical flanges of the angle members.

3. A reduced weight, vertically stiff structural component for the frame of a vehicle chassis comprising:
    a steel body having a generally C-shaped vertical cross section, including upper and lower horizontal flange interconnected by a vertical web member;
    the flanges sized to provide substantially all of the vertical stiffness of the structural component;
    the web member having a substantially reduced effective vertical cross section by the removal of web material without adversely affecting the vertical stiffness of the component; and,
    wherein the frame component comprises a siderail, the horizontal flanges comprise a pair of vertically separated individual angle members each having an integral vertical flange, and the reduced effective vertical cross section of the web member comprises truss elements interconnecting the vertical flanges of the angle members.

4. A reduced weight, vertically stiff structural component for the frame of a vehicle chassis comprising:
    a steel body having a generally C-shaped vertical cross section, including upper and lower horizontal flange interconnected by a vertical web member;

the flanges sized to provide substantially all of the vertical stiffness of the structural component;

the web member having a substantially reduced effective vertical cross section by the removal of web material without adversely affecting the vertical stiffness of the component; and, wherein the frame component comprises a siderail, the horizontal flanges comprise a pair of vertically separated individual angle members each having an integral vertical flange, and the reduced effective vertical cross section of the web member comprises a web member interconnecting the vertical flanges of said angle members and having a smaller gauge than the angle members.

5. The structural frame component as set forth in claim 1 wherein the frame component comprises a siderail.

* * * * *